United States Patent
Biondi et al.

(10) Patent No.: US 11,937,607 B2
(45) Date of Patent: *Mar. 26, 2024

(54) MACHINE FOR MAKING FILLED PASTA

(71) Applicant: Azionaria Costruzioni Macchine Automatiche A.C.M.A. S.p.A., Bologna (IT)

(72) Inventors: Andrea Biondi, Bologna (IT); Ivanoe Bertuzzi, Casalecchio di Reno Casalecchio di Reno (IT); Rudi Gavagni, Casalecchio di Reno (IT); Riccardo Ruggeri, Bologna (IT); Marco Zecchi, Malalbergo (IT); Marco Garganelli, Argelato (IT)

(73) Assignee: AZIONARIA COSTRUZIONI MACCHINE AUTOMATICHE A.C.M.A. S.P.A., Bologna (IT)

( * ) Notice: Subject to any disclaimer, the term of this patent is extended or adjusted under 35 U.S.C. 154(b) by 903 days.

This patent is subject to a terminal disclaimer.

(21) Appl. No.: 16/482,512

(22) PCT Filed: Feb. 21, 2018

(86) PCT No.: PCT/IB2018/051049
§ 371 (c)(1),
(2) Date: Jul. 31, 2019

(87) PCT Pub. No.: WO2018/154448
PCT Pub. Date: Aug. 30, 2018

(65) Prior Publication Data
US 2019/0357547 A1    Nov. 28, 2019

(30) Foreign Application Priority Data
Feb. 21, 2017 (IT) .................. 102017000019161

(51) Int. Cl.
*A21C 9/06* (2006.01)

(52) U.S. Cl.
CPC .................. *A21C 9/066* (2013.01)

(58) Field of Classification Search
CPC ......... A21C 11/08; A21C 11/63; A21C 9/068; A21C 9/241; A21C 11/06; A21C 11/04;
(Continued)

(56) References Cited

U.S. PATENT DOCUMENTS

| 1,844,142 A * | 2/1932 | Arthur | ................... A21C 9/066 |
| | | | 99/450.2 |
| 2,227,728 A * | 1/1941 | Lombi | ................... A21C 9/066 |
| | | | 99/450.2 |

(Continued)

FOREIGN PATENT DOCUMENTS

| CN | 2689707 Y | 4/2005 |
| CN | 103429090 A | 12/2013 |

(Continued)

OTHER PUBLICATIONS

International Search Report and Written Opinioin dated Jun. 7, 2018 for counterpart International Patent Application No. PCT/IB2018/051049.

(Continued)

*Primary Examiner* — Emmanuel S Luk
(74) *Attorney, Agent, or Firm* — SHUTTLEWORTH & INGERSOLL, PLC; Timothy J. Klima

(57) ABSTRACT

A machine for making filled pasta includes first and second feeding device for feeding first and second layers of pasta dough, and a shaping device for shaping the filled pasta, located downstream of the feeding devices. The machine controls the advancing of the first and second layers the respective feeding device such that at least along a first stretch of the path of the first layer between the first feeding device and the shaping device, an excess length of the first layer of pasta dough forms by gravity a respective bend (Continued)

along the unrolling direction and at least along a first stretch of the path of the second layer between the second feeding device and the shaping device, an excess length of the second layer of pasta dough forms by gravity a respective bend along the unrolling direction.

16 Claims, 1 Drawing Sheet

(58) Field of Classification Search
CPC ....... A21C 9/066; B29C 44/48; B29C 44/485; B29C 2043/467; B29C 2043/461; B29C 2043/3678; B29C 2043/465; B29C 2043/3676; B30B 3/005; B30B 11/003; B30B 3/00; B30B 11/006
See application file for complete search history.

(56) References Cited

U.S. PATENT DOCUMENTS

| | | | |
|---|---|---|---|
| 2,714,861 A | 8/1955 | Castronuovo | |
| 2,774,313 A * | 12/1956 | Lombi | A21C 9/066 99/450.2 |
| 3,593,676 A * | 7/1971 | Reid | A21C 3/02 425/335 |
| 3,603,270 A * | 9/1971 | Tangel | A21C 9/066 425/513 |
| 3,605,641 A * | 9/1971 | Shuster | A21C 1/06 425/513 |
| 4,028,024 A * | 6/1977 | Moreland | A61J 3/07 425/804 |
| 4,578,027 A | 3/1986 | Koppa et al. | |
| 4,848,218 A * | 7/1989 | Battaglia | A21C 9/066 99/450.2 |
| 4,880,371 A * | 11/1989 | Spinelli | A21C 3/02 425/141 |
| 4,941,402 A * | 7/1990 | D'Alterio | A21C 9/066 99/450.6 |
| 5,010,807 A * | 4/1991 | Anderson | A21C 9/066 99/450.2 |
| 5,297,947 A | 3/1994 | Cardinali | |
| 5,558,894 A * | 9/1996 | Henson | A23L 7/13 426/514 |
| 5,590,589 A * | 1/1997 | Battaglia | A21C 11/06 99/450.2 |
| 6,099,885 A * | 8/2000 | Nelson | A23P 20/20 99/450.2 |
| 6,230,613 B1 * | 5/2001 | Porcari | A21C 9/066 99/450.2 |
| 6,302,013 B1 * | 10/2001 | Batagllia | A21C 9/066 99/450.2 |
| 7,284,973 B2 * | 10/2007 | van Esbroeck | A23L 13/03 425/134 |
| 9,414,605 B2 * | 8/2016 | Le Paih | A22C 7/0076 |
| 9,693,571 B2 | 7/2017 | Cocchi et al. | |
| 2003/0024360 A1 | 2/2003 | Ribble | |
| 2005/0226963 A1 * | 10/2005 | Addington | A23L 7/13 426/104 |
| 2010/0173052 A1 * | 7/2010 | Suski | A21C 5/003 425/294 |
| 2015/0366222 A1 * | 12/2015 | Bertuzzi | A21C 9/06 99/450.7 |

FOREIGN PATENT DOCUMENTS

| | | |
|---|---|---|
| CN | 103501620 A | 1/2014 |
| CN | 203435611 U | 2/2014 |
| CN | 203692314 U | 7/2014 |
| CN | 104413099 A | 3/2015 |
| CN | 205727837 U | 11/2016 |
| EP | 0307614 A1 | 3/1989 |
| EP | 2092828 A2 | 8/2009 |
| EP | 2947993 A1 | 12/2015 |
| FR | 1160504 A | 7/1958 |
| GB | 2171225 A | 8/1986 |
| WO | 8804891 A1 | 7/1988 |
| WO | 9730592 A1 | 8/1997 |
| WO | 2012107236 A2 | 8/2012 |

OTHER PUBLICATIONS

International Search Report and Written Opinion dated Jun. 7, 2018 from related PCT App No. PCT/IB2018/051064.
International Search Report and Written Opinion dated Jun. 7, 2018 from related PCT App No. PCT/IB2018/051053.
Chinese Office Action dated Dec. 2, 2020 from related Chinese Patent Application No. 201880012663.1.
Chinese Office Action dated Dec. 22, 2020 from related Chinese Patent Application No. 201880012618.6.
1 Chinese Office Action dated May 8, 2021 from related Chinese Patent Application No. 201880012663.1.
Guareschi—U.S. Appl. No. 16/482,477, filed Jul. 31, 2019.
Biondi—U.S. Appl. No. 16/482,503, filed Jul. 31, 2019.

* cited by examiner

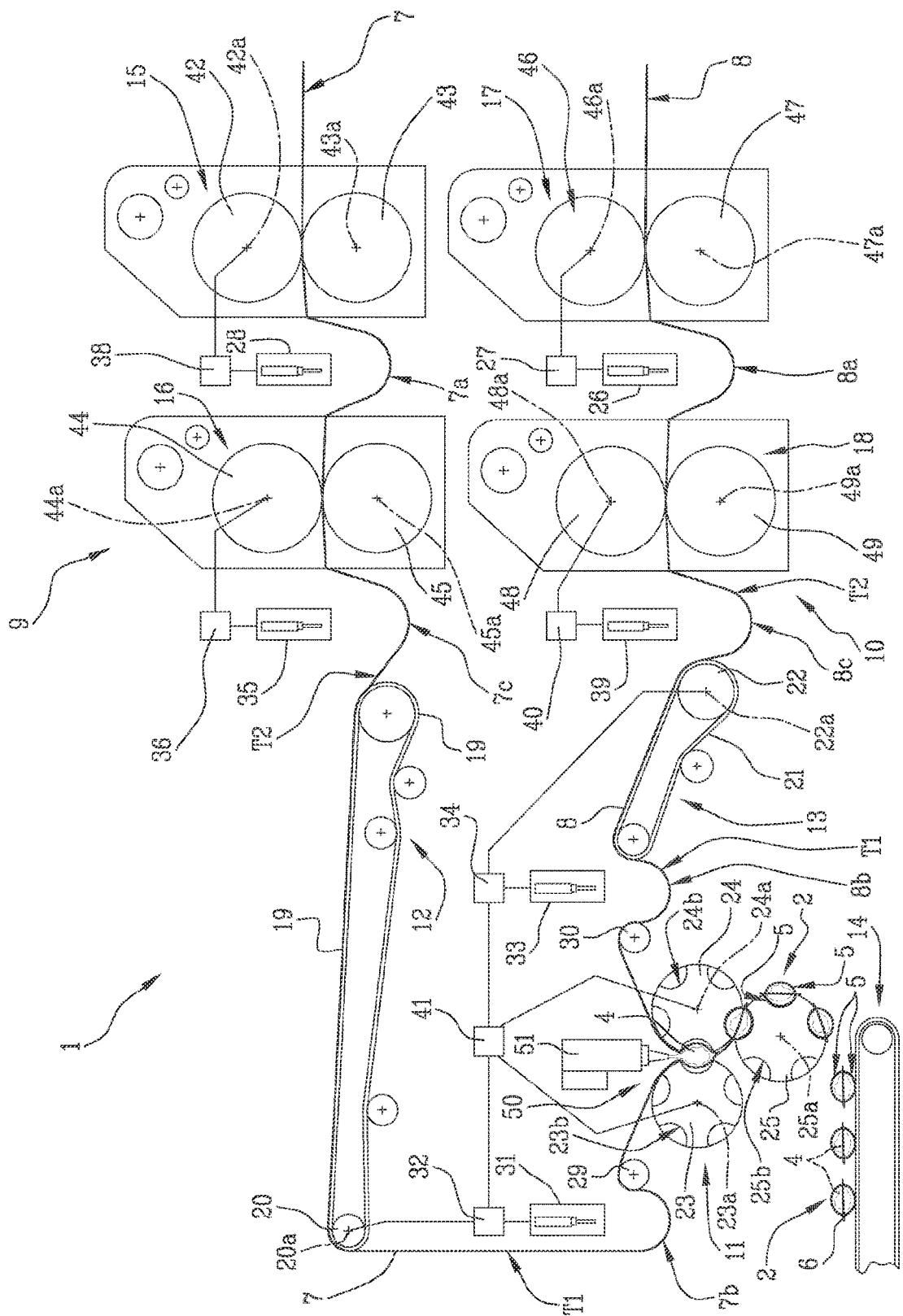

MACHINE FOR MAKING FILLED PASTA

This application is the National Phase of International Application PCT/IB2018/051049 filed Feb. 21, 2018 which designated the U.S.

This application claims priority to Italian Patent Application No. 102017000019161 filed Feb. 21, 2017, which application is incorporated by reference herein.

TECHNICAL FIELD

This invention relates to a machine for making filled pasta.

The term "filled pasta" is used to mean a type of pasta consisting of one or more layers of dough stuffed with a filling of meat, fish, vegetable or cheese.

For example, ravioli is a filled pasta product of circular shape having, on each side of the dough layer, a respective bulge formed by the filling and also known as "belly" in the jargon of the trade.

To be able to supply it to large-scale distributors, filled pasta is made by automatic machines which generally comprise a device for feeding a respective layer of dough to a shaping device which is configured to advance the dough layers while shaping them in such a way that they can retain the filling, to join the dough layers with the filling and to cut them to the desired shape to obtain the finished filled pasta product.

The filled products leaving the shaping device are received by a respective conveyor which carries them down the production line for further processing.

BACKGROUND ART

In prior art automatic machines for the production of filled pasta, such as, for example, the one described in document EP2092828, the dough layer leaving the feeding device is inserted directly into the shaping device.

The shaping device controls the advancing motion of the dough layers and, at steady state, advances the dough layers at a speed greater than the speed at which the layers of dough are fed out of the feeding device.

This operating condition, however, subjects the dough layers to a state of tensile stress along the unrolling direction.

On leaving the shaping device, the dough layers are no longer subjected to the state of tensile stress and, as a result of dough elasticity, the dough layers are subject to unwanted shrinkage which has a negative effect on the features of the finished filled pasta product.

DISCLOSURE OF THE INVENTION

In this context, this invention, according to one aspect of it, provides a machine for making filled pasta comprising a first feeding device for feeding a first layer of pasta dough and a second feeding device for feeding a second layer of pasta dough and a shaping device for shaping the filled pasta, located downstream of the first and second feeding devices, with reference to the direction of unrolling the first and second layers of pasta dough.

The machine according to this invention is configured to control the advancing of the first and second layers of pasta dough by the respective feeding device in such a way that at least along a first stretch of the path of the first layer of dough between the first feeding device for feeding the first layer of pasta dough and the shaping device, an excess length of the first layer of pasta dough forms by gravity a respective bend along the unrolling direction and at least along a first stretch of the path of the second layer of dough between the second feeding device for feeding the second layer of pasta dough and the shaping device, an excess length of the second layer of pasta dough forms by gravity a respective bend along the unrolling direction.

The depth of the bend in the first and the second layer is in a range between a minimum and a maximum value along the vertical.

Advantageously, the excess length of the dough layer allows minimizing the state of tensile stress which the dough layer is subjected to along the unrolling direction from the feeding device to the shaping device, thus overcoming the problem of dough shrinkage after the filled product leaves the shaping device.

BRIEF DESCRIPTION OF DRAWINGS

Further features and advantages of the invention are more apparent in the non-limiting description which follows, of preferred but non-exclusive embodiments of a machine for making filled pasta as illustrated in FIG. 1, which shows a schematic front view of the machine for making filled pasta according to this invention.

DETAILED DESCRIPTION OF PREFERRED EMBODIMENTS OF THE INVENTION

The reference numeral 1 denotes a machine for making filled pasta.

The filled pasta 2 of this specification is preferably a pasta product comprising two layers of pasta dough 7, 8, specifically a first dough layer 7 and a second dough layer 8 enclosing between them a filling 4, for example based on meat, fish, vegetables or cheese.

The dough layers 7, 8 of the filled pasta 2 are superposed and sealed to each other along a common joining zone 6 in order to prevent the filling 4 from escaping.

The filled pasta 2 of this specification has, on each side defined by the first and the second dough layer 7 and 8, a respective bulge 5, formed by the filling 4 and also known as "belly" in the jargon of the trade.

The filled pasta 2 is preferably disc shaped. The dough layers 7, 8 are accordingly superposed and sealed along a circular crown 6 surrounding the filling 4.

The machine 1 of this specification comprises a first feeding device 9 for feeding a first layer 7 of pasta dough and a second feeding device 10 for feeding a second layer 8 of pasta dough.

A shaping device 11 for shaping the filled pasta 2 is located downstream of the first and second feeding devices 9, 10, with reference to the direction of unrolling the first and second layers 7, 8 of pasta dough.

The shaping device 11 is configured to advance the first and second layers 7, 8 of pasta dough and is also configured, while it advances them, to shape the first and second layers 7, 8 in such a way as to receive the filling 4 and to seal the first and second dough layers 7, 8 to each other to define the joining zone 6.

The shaping device 11 is configured to cut the first and second layers 7, 8, individually separating each product 2 from the dough layers 7, 8, specifically from the first and the second layer 7 and 8.

Downstream of the shaping device 11, each filled pasta product 2 is transported by a conveyor line 14 for further processing in other production machines.

The shaping device 11 of the machine 1 comprises a first and a second roller 23, 24 for advancing and shaping a respective first and second layer 7, 8 of pasta dough, specifically the first and the second layer 7 and 8, and for coupling the first and the second layers 7, 8 themselves.

The first roller 23 rotates about its axis of rotation 23a.

The second roller 24 rotates about its axis of rotation 24a.

The axes of rotation 23a, 24a of the rollers 23, 24 are parallel to each other.

The shaping device 11 comprises dispensing means 51 for delivering the filling 4 and disposed above the first and the second roller 23 and 24 centrally relative thereto in such a way as to deliver the filling 4 to the first layer 7 and to the second layer 8.

The first and second rollers 23 and 24 of the shaping device 11 are disposed to face each other and to be tangent at a shaping zone 50 so as to couple the dough layers 7, 8 around the filling 4 delivered by the dispensing means 51.

The dispensing means 51 deliver the filling 4 to the shaping zone 50 before the first layer 7 and the second layer 8 are coupled.

The first and the second roller 23 and 24 of the shaping device 11 each have on the peripheral surface respective moulds 23b and 24b which are configured to shape the respective dough layer 7, 8 so as to receive the filling 4.

The shaping device 11 comprises a cutting roller 25 acting in conjunction with one of either the first roller 23 or the second roller 24, specifically with the second roller 24, in order to individually separate each product 2 from the dough layers 7, 8, specifically from the first and the second layer 7 and 8.

The cutting roller 25 rotates about its axis of rotation 25a.

The axis of rotation 25a of the cutting roller 25 is parallel to the axes of rotation 23a and 24a of the advancing and shaping rollers 23 and 24.

On the peripheral surface of it, the cutting roller 25 has respective cutting edges 25b shaped to cut the dough layer 7, 8 at the sealing zone 6.

The cutting roller 25 releases each filled pasta product 2 onto the conveyor line 14.

In the embodiment illustrated, the machine 1 comprises at least one advancing means 12 for advancing the first dough layer 7 and interposed between the first feeding device 9 and the shaping device 11.

The advancing means 12 of the first dough layer 7 comprises a conveyor belt 19 moved by a respective driving element 20.

The driving element 20 rotates about its axis of rotation 20a.

The machine 1 comprises at least one advancing means 13 for advancing the second dough layer 8 and interposed between the second feeding device 10 and the shaping device 11.

The advancing means 13 of the second dough layer 8 comprises a conveyor belt 21 moved by a respective driving element 22.

The driving element 22 rotates about its axis of rotation 22a.

The first feeding device 9 comprises at least a first pair 15 of laminating rollers 42, 43 for laminating the first layer 7 of pasta dough.

The laminating rollers 42 and 43 of the first pair 15 rotate about respective axes of rotation 42a and 43a.

Preferably, the first feeding device 9 comprises at least a first pair 15 of laminating rollers 42, 43 and a second pair 16 of laminating rollers 44, 45 for laminating the first layer 7 of pasta dough.

The laminating rollers 44 and 45 of the second pair 16 rotate about respective axes of rotation 44a and 45a.

The second pair 16 of laminating rollers 44, 45 is located after the first pair 15 of laminating rollers 42, 43 with reference to the unrolling direction of the first layer 7 of pasta dough.

The first feeding device 9 is configured to feed the first layer 7 of dough from the first pair 15 of laminating rollers 42 and 43 to the second pair 16 of laminating rollers 44 and 45 in such a way that an excess length of the first layer 7 of dough forms by gravity a respective bend 7a along the unrolling direction between the first pair 15 of laminating rollers 42 and 43 and the second pair 16 of laminating rollers 44 and 45.

The depth of the bend 7a in the first layer 7 is in a range between a minimum and a maximum value along the vertical.

At the bend 7a in the first dough layer 7 between the first pair 15 of laminating rollers 42, 43 and the second pair 16 of laminating rollers 44, 45 of the first feeding device 9, the machine 1 comprises at least one measuring means 28 for measuring the depth of the bend 7a along the vertical.

Preferably, the measuring means 28 is a photocell.

The measuring means 28 for measuring the depth of the bend 7a is connected to a control unit 38 for controlling the advancing speed of the first layer 7 upstream of the first pair 15 of laminating rollers 42 and 43.

More specifically, the control unit 38 is configured to control the rotation of at least one of the laminating rollers 42 and 43 of the first pair 15.

The control unit 38 is configured to reduce the advancing speed of the first layer 7, specifically the rotation speed of at least one of the laminating rollers 42 and 43 of the first pair 15 if the depth of the bend 7a along the vertical, measured by the measuring means 28, is above a predetermined maximum threshold value.

The control unit 38 is configured to increase the advancing speed of the first layer 7, specifically the rotation speed of at least one of the laminating rollers 42 and 43 of the first pair 15 if the depth of the bend 7a along the vertical, measured by the measuring means 28, is below a predetermined minimum threshold value.

The second feeding device 10 comprises at least a first pair 17 of laminating rollers 46 and 47 for laminating the second layer 8 of pasta dough.

The laminating rollers 46 and 47 of the first pair 17 rotate about respective axes of rotation 46a, 47a.

Preferably, the second feeding device 10 comprises at least a first pair 17 of laminating rollers 46 and 47 and a second pair 18 of laminating rollers 48 and 49 for laminating the second layer 8 of pasta dough.

The second pair 18 of laminating rollers 48 and 49 is located after the first pair 17 of laminating rollers 46 and 47 with reference to the unrolling direction of the second layer 8 of pasta dough.

The laminating rollers 48 and 49 of the second pair 18 rotate about respective axes of rotation 48a and 49a.

The second feeding device 10 is configured to feed the second layer 8 of dough from the first pair 17 of laminating rollers 46 and 47 to the second pair 18 of laminating rollers 48 and 49 in such a way that an excess length of the second layer 8 of dough forms by gravity a respective bend 8a along the unrolling direction between the first pair 17 of laminating rollers 46 and 47 and the second pair 18 of laminating rollers 48 and The depth of the bend 8a in the second layer 8 is in a range between a minimum and a maximum value along the vertical.

At the bend 8a in the second dough layer 8 between the first pair 17 of laminating rollers 46 and 47 and the second pair 18 of laminating rollers 48 and 49, the machine 1 comprises a measuring means 26 for measuring the depth of the bend 8a along the vertical.

Preferably, the measuring means 26 is a photocell.

The measuring means 26 for measuring the depth of the bend 8a is connected to a control unit 27 for controlling the advancing speed of the second layer 8 upstream of the second pair 18 of laminating rollers 48 and 49.

More specifically, the control unit 27 is configured to control the rotation of at least one of the rollers 46 and 47 of the first pair 17.

The control unit 27 is configured to reduce the advancing speed of the second layer 8, specifically the rotation speed of at least one of the laminating rollers 46 and 47 of the first pair 17 if the depth of the bend 8a along the vertical, measured by the measuring means 26, is above a predetermined maximum threshold value.

The control unit 27 is configured to increase the advancing speed of the second layer 8, specifically the rotation speed of at least one of the laminating rollers 46 and 47 of the first pair 17 if the depth of the bend 8a along the vertical, measured by the measuring means 26, is below a predetermined minimum threshold value.

According to this invention, the machine 1 is configured to control the advancing of the first and second layers 7 and 8 of pasta dough by the respective feeding device 9 and 10 in such a way that at least along a first stretch T1 of the path of the first layer 7 of dough between the first feeding device 9 for feeding the first layer 7 of pasta dough and the shaping device 11, an excess length of the first layer 7 of pasta dough forms by gravity a respective bend 7b along the unrolling direction and at least along a first stretch T1 of the path of the second layer 8 of dough between the second feeding device 10 for feeding the second layer 8 of pasta dough and the shaping device 11, an excess length of the second layer 8 of pasta dough forms by gravity a respective bend 8b along the unrolling direction.

The bend 7b in the first layer 7 along the first stretch T1 of the path of the first dough layer 7 between the first feeding device 9 for feeding the first layer 7 of pasta dough and the shaping device 11 has a depth which is in a range between a minimum value and a maximum value along the vertical.

The bend 8b in the second layer 8 along the first stretch T1 of the path of the second dough layer 8 between the first feeding device 10 for feeding the second layer 8 of pasta dough and the shaping device 11 has a depth which is in a range between a minimum value and a maximum value along the vertical.

Preferably, the bend 7b in the first layer 7 along the first stretch T1 and the bend 8b in the second layer 8 along the first stretch T1 are disposed symmetrically to each other relative to the shaping device 11.

With reference to the embodiment illustrated, an excess length of the first layer 7 of dough forms at least one bend 7b along the first stretch T1 of the path of the first layer 7 of dough between the advancing means 12 and the shaping device 11.

An excess length of the second layer 8 of dough forms at least one bend 8b along the first stretch T1 of the path of the second layer 8 of dough between the advancing means 13 and the shaping device 11.

The machine 1 comprises at least one roller 29 for supporting the first dough layer 7 forming the respective bend 7b and disposed between the advancing means 12 and the shaping device 11, and at least one roller 30 for supporting the second dough layer 8 forming the respective bend 8b and disposed between the advancing means 13 and the shaping device 11.

At the bend 7b in the first dough layer 7 disposed along the first stretch T1, the machine 1 comprises at least one measuring means 31 for measuring the depth of the bend 7b along the vertical.

Preferably, the measuring means 31 is a photocell.

The measuring means 31 for measuring the depth of the bend 7b is connected to a control unit 32 for controlling the advancing speed of the first layer 7 upstream of the shaping device 11.

More specifically, the control unit 32 is configured to control the advancing speed of the advancing means 12 for advancing the first layer 7 upstream of the shaping device 11.

The control unit 32 is configured to control the rotation speed of the driving element 20.

The control unit 32 is configured to reduce the advancing speed of the first layer 7 upstream of the shaping device 11, specifically of the advancing means 12 for advancing the first layer 7, if the depth of the bend 7b along the vertical, measured by the measuring means 31, exceeds a predetermined maximum threshold value.

The control unit 31 is configured to increase the advancing speed of the first layer 7 upstream of the shaping device 11, specifically of the advancing means 12 for advancing the first layer 7, if the depth of the bend 7b along the vertical, measured by the measuring means 31, is below a predetermined minimum threshold value.

At the bend 8b in the second dough layer 8 disposed along the first stretch T1, the machine 1 comprises at least one measuring means 33 for measuring the depth of the bend 8b along the vertical.

Preferably, the measuring means 33 is a photocell.

The measuring means 33 for measuring the depth of the bend 8b is connected to a control unit 34 for controlling the advancing speed of the second layer 8 upstream of the shaping device 11.

More specifically, the control unit 34 is configured to control the advancing speed of the advancing means 13 for advancing the second layer 8 upstream of the shaping device 11.

The control unit 34 is configured to control the rotation speed of the driving element 22.

The control unit 34 is configured to reduce the advancing speed of the second layer 8 upstream of the shaping device 11, specifically of the advancing means 13 for advancing the second layer 8, if the depth of the bend 8b along the vertical, measured by the measuring means 33, exceeds a predetermined maximum threshold value.

The control unit 34 is configured to increase the advancing speed of the second layer 8 upstream of the shaping device 11, specifically of the advancing means 13 for advancing the second layer 8, if the depth of the bend 8b along the vertical, measured by the measuring means 33, is below a predetermined minimum threshold value.

The machine 1 comprises a control unit 41 for controlling the advancing speed of the first and second layers 7, 8 in the shaping device 11, specifically of the rotation speed of the first and the second shaping roller 23 and 24.

The measuring means 31 for measuring the bend 7b in the first layer 7 along the first stretch T1 and the measuring means (33) for measuring the bend 8*b* in the second layer 8 along the first stretch T1 are configured to be connected to the control unit 41.

The control unit 41 is configured to control the advancing speed of the first and second layers 7 and 8 in the shaping device 11, specifically of the rotation speed of the first and the second advancing and shaping roller 23 and 24, increasing or reducing it as a function of the depth of the bend 7*b* in the first layer 7 along the vertical, measured by the measuring means 31 and as a function of the depth of the bend 8*b* in the second layer 8 along the vertical, measured by the respective measuring means 33.

In the embodiment illustrated, the machine 1 is configured to control the advancing of the first layer 7 of dough by the first feeding device 9 in such a way that at least along a second stretch T2 of the path of the first layer 7 of dough between the first feeding device 9 for feeding the first layer 7 of pasta dough and the advancing means 12 for advancing the first layer 7, an excess length of the first layer 7 forms by gravity a respective bend 7*c* along the unrolling direction.

The bend 7*c* in the first layer 7 along the second stretch T2 of the path of the first dough layer 7 between the first feeding device 9 for feeding the first layer 7 of pasta dough and the advancing means 12 has a depth which is in a range between a minimum value and a maximum value along the vertical.

At the bend 7*c* in the first dough layer 7 disposed along the second stretch T2, the machine 1 comprises at least one measuring means 35 for measuring the depth of the bend 7*c* along the vertical.

Preferably, the measuring means 35 is a photocell.

The measuring means 35 for measuring the depth of the bend 7*c* is connected to a control unit 36 for controlling the advancing speed of the first layer 7 upstream of the advancing means 12.

More specifically, the control unit 36 is configured to control the rotation speed of at least one of the rollers 44, 45 of the second pair 16 of the first feeding device 9.

The control unit 36 is configured to reduce the advancing speed of the first layer 7 upstream of the advancing means 12, specifically the rotation speed of at least one of the rollers 44 and 45 of the second pair 16 of the first feeding device 9 if the depth of the bend 7*c* along the vertical, measured by the measuring means 35, is above a predetermined maximum threshold value.

The control unit 36 is configured to increase the advancing speed of the first layer 7 upstream of the advancing means 12, specifically the rotation speed of at least one of the rollers 44 and 45 of the second pair 16 of the first feeding device 9 if the depth of the bend 7*c* along the vertical, measured by the measuring means 35, is below a predetermined minimum threshold value.

The machine 1 is configured to control the advancing of the second layer 8 of dough by the second feeding device 10 in such a way that at least along a second stretch T2 of the path of the second layer 8 of dough between the second feeding device 10 for feeding the second layer 8 of pasta dough and the advancing means 13, an excess length of the second layer 8 of dough forms by gravity a respective bend 8*c* along the unrolling direction.

The bend 8*c* in the second layer 8 along the second stretch T2 of the path of the second dough layer 8 between the second feeding device 10 for feeding the second layer 8 of pasta dough and the advancing means 13 is in a range between a minimum value and a maximum value along the vertical.

At the bend 8*c* in the second dough layer 8 disposed along the second stretch T2, the machine 1 comprises at least one measuring means 39 for measuring the depth of the bend 8*c* along the vertical.

Preferably, the measuring means 39 is a photocell.

The measuring means 39 for measuring the depth of the bend 8*c* is connected to a control unit 40 for controlling the advancing speed of the second layer 8 upstream of the advancing means 13.

More specifically, the control unit 40 is configured to control the rotation speed of at least one of the rollers 48 and 49 of the second pair 18 of the second feeding device 10.

The control unit 40 is configured to reduce the advancing speed of the second layer 8 upstream of the advancing means 13, specifically the rotation speed of at least one of the rollers 48, 49 of the second pair 18 of the second feeding device 10 if the depth of the bend 8*c* along the vertical, measured by the measuring means 39, is above a predetermined maximum threshold value.

The control unit 40 is configured to increase the advancing speed of the second layer 8 upstream of the advancing means 13, specifically the rotation speed of at least one of the rollers 48, 49 of the second pair 18 of the second feeding device 10 if the depth of the bend 8*c* along the vertical, measured by the measuring means 39, is below a predetermined minimum threshold value.

It should be noted that according to this invention, the machine 1 is configured to control the advancing of the first dough layer 7 in such a way that an excess length thereof forms by gravity at least one bend 7*a*, 7*b*, 7*c* downstream of each advancing means 12, 15, 16 towards the shaping device 11.

The machine 1 is configured to control the advancing of the second dough layer 8 in such a way that an excess length thereof forms by gravity at least one bend 8*a*, 8*b*, 8*c* downstream of each advancing means 13, 17, 18 towards the shaping device 11.

Advantageously, the bends 7*a*, 7*b*, 7*c* in the first dough layer 7 and the bends 8*a*, 8*b*, 8*c* in the second dough layer 8 downstream of each respective advancing means 12, 15, 16, 13, 17, 18 towards the shaping device 11 allow minimizing the state of tensile stress of the first and second dough layers 7 and 8 entering the shaping device 11.

Consequently, the filled pasta 2 leaving the shaping device 11 keeps its shape and does not undergo shape deformation during the production process.

The invention claimed is:

1. A machine for making filled pasta comprising:
   a first feeding device configured for feeding a first layer of pasta dough,
   a second feeding device including at least one pair of laminating rollers configured for feeding a second layer of pasta dough,
   a shaping device including at least one driven movable mold defining a cavity and a sealing edge surrounding at least a portion of the cavity, the cavity receiving the first and second layers of pasta dough and a filling to form the filled pasta, the shaping device located downstream of the first and second feeding devices, with reference to an unrolling direction of the first and second layers of pasta dough;
   the shaping device being configured to advance the first and second layers of pasta dough and also configured, while advancing the first and second layers of pasta dough, to shape the first and second layers of pasta dough to receive the filling and to seal the first and second layers of pasta dough to each other with the sealing edge to define a joining zone;

the machine being configured to control the advancing of the first and second layers of pasta dough by the respective first and second feeding devices such that at least along a first stretch of a path of the first layer of pasta dough between the first feeding device and the shaping device, an excess length of the first layer of pasta dough forms by gravity a respective first bend having a vertical orientation along the unrolling direction and at least along a first stretch of a path of the second layer of pasta dough between the second feeding device and the shaping device, an excess length of the second layer of pasta dough forms by gravity a respective second bend having a vertical orientation along the unrolling direction;

wherein the first feeding device comprises a first pair of laminating rollers and a second pair of laminating rollers configured for laminating the first layer of pasta dough; the second pair of laminating rollers being located after the first pair of laminating rollers with reference to the unrolling direction of the first layer of pasta dough;

a first advancing device including a first driven conveyor configured for advancing the first layer of pasta dough and interposed between at least a portion of the first feeding device and the shaping device for causing the excess length of the first layer of pasta dough to form the first bend along the first stretch of the path of the first layer of pasta dough between the first advancing device and the shaping device; the first driven conveyor having an upward facing surface which supports a weight of the first layer of pasta dough along a length of the first driven conveyor, thereby precluding stretch of the first layer of pasta dough along the length of the first driven conveyor, the excess length of the first layer of pasta dough forming the first bend along the first stretch of the path of the first layer of pasta dough between the first driven conveyor and the shaping device, directly downstream of the first driven conveyor;

a second advancing device including a second driven conveyor configured for advancing the second layer of pasta dough and interposed between at least a portion of the second feeding device and the shaping device for causing the excess length of the second layer of pasta dough to form the second bend along the first stretch of the path of the second layer of pasta dough between the second advancing device and the shaping device, the second driven conveyor having an upward facing surface which supports a weight of the second layer of pasta dough along a length of the second driven conveyor, thereby precluding stretch of the second layer of pasta dough along the length of the second driven conveyor, the excess length of the second layer of pasta dough forming the second bend along the first stretch of the path of the second layer of pasta dough between the second driven conveyor and the shaping device, directly downstream of the second driven conveyor;

a first control unit and a first measuring device configured for measuring a vertical depth of the first bend; the first measuring device being connected to the first control unit for controlling a speed of the first layer of pasta dough upstream of the shaping device; the first control unit being configured to control an advancing speed of the first advancing device to 1) reduce an advancing speed of the first layer of pasta dough upstream of the shaping device if the vertical depth of the first bend, measured by the first measuring device, exceeds a first predetermined maximum threshold value, and 2) increase the advancing speed of the first layer of pasta dough upstream of the shaping device if the vertical depth of the first bend, measured by the first measuring device, is below a first predetermined minimum threshold value;

a second control unit and a second measuring device configured for measuring a vertical depth of the second bend in the second layer of pasta dough; the second measuring device being connected to the second control unit for controlling a speed of the second layer of pasta dough upstream of the shaping device; the second control unit being configured to control an advancing speed of the second advancing device to 1) reduce an advancing speed of the second layer of pasta dough upstream of the shaping device if the vertical depth of the second bend, measured by the second measuring device, exceeds a second predetermined maximum threshold value, and 2) increase the advancing speed of the second layer of pasta dough upstream of the shaping device if the vertical depth of the second bend, measured by the second measuring device, is below a second predetermined minimum threshold value.

2. The machine according to claim 1, wherein the first bend in the first layer of pasta dough and the second bend in the second layer of pasta dough are disposed symmetrically to each other relative to the shaping device.

3. The machine according to claim 1, and further comprising a third control unit configured to control the advancing speed of the first layer of pasta dough leaving the first feeding device.

4. The machine according to claim 1, wherein the machine is configured to control the advancing of the second layer of pasta dough by the second feeding device such that at least along a second stretch of the path of the second layer of pasta dough between the second feeding device and the advancing device, an excess length of the second layer of pasta dough forms by gravity a fourth bend along the unrolling direction.

5. The machine according to claim 4, and further comprising a fourth control unit and a fourth measuring device configured for measuring a vertical depth of the second bend; the fourth measuring device being connected to the fourth control unit for controlling the advancing of the second layer of pasta dough upstream of the second advancing device; the fourth control unit being configured to reduce the advancing speed of the second layer of pasta dough if the vertical depth of the fourth bend, measured by the fourth measuring device, exceeds a fourth predetermined maximum threshold value; the fourth control unit being configured to increase the advancing speed of the second layer of pasta dough if the vertical depth of the fourth bend, measured by the fourth measuring device, is below a fourth predetermined minimum threshold value.

6. The machine according to claim 5, wherein the fourth control unit is configured to control the advancing speed of the second feeding device for feeding the second layer of pasta dough.

7. The machine according to claim 1, wherein the first feeding device is configured to feed the first layer of pasta dough from the first pair of laminating rollers to the second pair of laminating rollers such that an excess length of the first layer of pasta dough forms by gravity a fifth bend along the unrolling direction between the first pair of laminating rollers and the second pair of laminating rollers.

8. The machine according to claim 7, and further comprising a fifth control unit and a fifth measuring device configured for measuring a vertical depth of the fifth bend; the fifth measuring device being connected to the fifth control unit configured for controlling an advancing speed of the first layer of pasta dough upstream of the first pair of laminating rollers; the fifth control unit being configured to control rotation of the first pair of laminating rollers to reduce the advancing speed of the first layer of pasta dough if the vertical depth of the fifth bend, measured by the fifth measuring device, exceeds a fifth predetermined maximum threshold value and to increase the advancing speed of the first layer of pasta dough if the vertical depth of the fifth bend, measured by the fifth measuring device, is below a fifth predetermined minimum threshold value.

9. The machine according claim 1, wherein the at least one pair of laminating rollers of the second feeding device comprises a third pair of laminating rollers and a fourth pair of laminating rollers configured for laminating the second layer of pasta dough and located after the third pair of laminating rollers with reference to the unrolling direction of the second layer of pasta dough; the second feeding device being configured to feed the second layer of pasta dough from the third pair of laminating rollers to the fourth pair of laminating rollers such that an excess length of the second layer of pasta dough forms by gravity a sixth bend along the unrolling direction between the third pair of laminating rollers and the fourth pair of laminating rollers.

10. The machine according to claim 9, and further comprising a sixth control unit and a sixth measuring device configured for measuring a vertical depth of the sixth bend; the sixth measuring device being connected to the sixth control unit configured for controlling an advancing speed of the second layer of pasta dough upstream of the fourth pair of laminating rollers; the sixth control unit being configured to control rotation of the third pair of laminating rollers to reduce the advancing speed of the second layer of pasta dough if the vertical depth of the sixth bend, measured by the sixth measuring device, exceeds a sixth predetermined maximum threshold value and to increase the advancing speed of the second layer of pasta dough if the vertical depth of the sixth bend, measured by the sixth measuring device, is below a sixth predetermined minimum threshold value.

11. The machine according to claim 1, wherein the machine comprises a seventh control unit configured for controlling an advancing speed of the first and second layers of pasta dough in the shaping device, the first measuring device being connected to the seventh control unit and configured for measuring the first bend of the first layer of pasta dough along the first stretch and the second measuring device being connected to the seventh control unit and configured for measuring the second bend of the second layer of pasta dough along the first stretch; the seventh control unit being configured to control an advancing speed of the first and second layers of pasta dough in the shaping device, increasing or reducing the advancing speed as a function of a vertical depth of the first bend of the first layer of pasta dough, measured by the first measuring device and as a function of a vertical depth of the second bend of the second layer of pasta dough, measured by the second measuring device.

12. The machine according to claim 1, wherein the first control unit is a first circuit and the second control unit is a second circuit.

13. The machine according to claim 12, wherein the first measuring device is a first sensor and the second measuring device is a second sensor.

14. The machine according to claim 12, wherein the first measuring device is a first photocell and the second measuring device is a second photocell.

15. The machine according to claim 1, wherein the first measuring device is a first sensor and the second measuring device is a second sensor.

16. The machine according to claim 1, wherein the first measuring device is a first photocell and the second measuring device is a second photocell.

* * * * *